(12) United States Patent
Lee

(10) Patent No.: US 8,986,833 B2
(45) Date of Patent: *Mar. 24, 2015

(54) ENAMEL VARNISH COMPOSITION FOR ENAMEL WIRE AND ENAMEL WIRE USING SAME

(75) Inventor: Joon-Hee Lee, Gunpo-si (KR)

(73) Assignee: LS Cable Ltd., Anyang (KR)

( * ) Notice: Subject to any disclaimer, the term of this patent is extended or adjusted under 35 U.S.C. 154(b) by 1263 days.

This patent is subject to a terminal disclaimer.

(21) Appl. No.: 11/816,780

(22) PCT Filed: May 27, 2005

(86) PCT No.: PCT/KR2005/001572
§ 371 (c)(1),
(2), (4) Date: Aug. 21, 2007

(87) PCT Pub. No.: WO2006/112568
PCT Pub. Date: Oct. 26, 2006

(65) Prior Publication Data
US 2009/0202830 A1 Aug. 13, 2009

(30) Foreign Application Priority Data

Feb. 21, 2005 (KR) .................. 10-2005-0014281
May 6, 2005 (KR) .................. 10-2005-0038167

(51) Int. Cl.
| | | |
|---|---|---|
| B32B 15/00 | (2006.01) | |
| C08G 73/14 | (2006.01) | |
| C08F 126/06 | (2006.01) | |
| C09J 179/08 | (2006.01) | |
| H01B 3/30 | (2006.01) | |

(52) U.S. Cl.
CPC .............. *C09J 179/08* (2013.01); *C08G 73/14* (2013.01); *H01B 3/305* (2013.01); *H01B 3/306* (2013.01)

USPC .......... 428/375; 528/322; 528/125; 526/261; 526/262; 174/110 SR

(58) Field of Classification Search
USPC .......... 525/420, 424; 528/45, 48, 51; 428/375
See application file for complete search history.

(56) References Cited

U.S. PATENT DOCUMENTS

| | | | | |
|---|---|---|---|---|
| 4,927,906 A | * | 5/1990 | Wang | 528/228 |
| 4,954,577 A | | 9/1990 | Dunwald et al. | |
| 5,216,117 A | * | 6/1993 | Sheppard et al. | 528/322 |
| 5,965,263 A | * | 10/1999 | Tatematsu et al. | 428/383 |
| 5,969,079 A | * | 10/1999 | Lubowitz et al. | 528/170 |
| 6,392,000 B1 | * | 5/2002 | Schuelke et al. | 528/49 |
| 6,680,120 B1 | * | 1/2004 | Nagel et al. | 428/383 |

FOREIGN PATENT DOCUMENTS

| | | |
|---|---|---|
| EP | 365877 | 5/1990 |
| JP | 55-125170 | 9/1980 |
| JP | 08-253583 | 10/1996 |
| WO | WO02/16476 | 2/2002 |

OTHER PUBLICATIONS

International Search Report, dated Nov. 17, 2005, in International patent appln. No. PCT/KR2005/001572.

* cited by examiner

*Primary Examiner* — Jeremy R Pierce
*Assistant Examiner* — Ricardo E Lopez
(74) *Attorney, Agent, or Firm* — NSIP Law

(57) ABSTRACT

Disclosed are enamel varnish compositions for an enamel wire and an enamel wire using the same. The present invention relates to enamel varnish compositions for an enamel wire in which a polymeric resin component is included in an organic solvent, wherein the polymeric resin component includes a first polyamideimide resin; and a second resin having polyamideimide in which a triazine ring is introduced into a major chain. The enamel wire, in which such a coating pigment composition is applied to the innermost layer, has the increased adhesivity of the insulated coating layer to the conducting wire, as well as the excellent physical properties such as the wear resistance and flexibility, etc.

7 Claims, No Drawings

ENAMEL VARNISH COMPOSITION FOR ENAMEL WIRE AND ENAMEL WIRE USING SAME

CROSS-REFERENCE TO RELATED APPLICATIONS

This application is a is a national stage application under 35 U.S.C. 371 based on and claiming the benefit of International Application Serial No. PCT/KR2005/001572 filed on May 27, 2005 which claims the benefit of priority from Korean Applications Nos. 10-2005-0014281 filed on Feb. 21, 2005, and 10-2005-0038167 filed on May 6, 2005 the entire contents of all of which are incorporated herein by reference.

TECHNICAL FIELD

The present invention relates to enamel varnish composition for enamel wire and an enamel wire using the same.

BACKGROUND ART

Generally, an enamel wire, which is an insulated wire, is wound in a coiledform in the inside of an electric apparatus, and functions to interconvert electrical energy and mechanical energy by means of a conversion process of magnetic energy. Such an enamel wire is generally composed of a conducting wire such as copper, etc. and an insulated coating layer surrounding the conducting wire, and it is manufactured by applying pigment, generally composed of organic solvent and polymeric resin, to a surface of a conductor, drying and cross-linking it at a high temperature of more than 400° C. to form a thin insulated coating layer. Here, the coating pigment is present in the state that the polymeric resin components are dissolved and dispersed in the organic solvent.

Such an enamel wire has been recently used in various fields such as heavy electric apparatuses, automotive parts, household appliances, medical appliances, and core materials in the aerospace industries, etc.

Recently, there has been required a small and light motor with high performance as the electric and electronic apparatuses increasingly tend toward their miniaturizaion and lightweightness. Accordingly, the winding number of the enamel wire wound around a motor core should be necessarily increased with trends of such miniaturizaion and lightweightness. Also, as the winding number of the enamel wire becomes increased and a size of the motor becomes smaller, an unreasonable process has been carried out, for example to forcibly fit the enamel wire into a core slot. As a result, there often appears a problem that the coating layer of the enamel wire is easily damaged.

Also, as a winding speed is further increased in order to improve productivity using winding machines, tensions and impacts inflicted on the enamel wire are also increased upon its winding, resulting in an increased damage of the insulated coating layer.

Such a damage of the insulated coating layer has a problem that it is a major cause of the poor inherent characteristics of the winding and also the deteriorated reliability of the motor.

In order to solve the problems, there have been attempts to give a lubricating ability to the insulated coating, mainly by adding an organic or inorganic lubricant to a coating pigment, or by directly applying a lubricant oil, etc. onto the enamel wire. However, the aforementioned problems were not fundamentally solved even in such a method.

As an alternative, mechanical strength of the insulated coating of the enamel wire was further increased so as to solve the problems, but simple increase of the mechanical strength allows the coating to be more rigid and less flexible. Accordingly, there are problems that the coating layer is easily cracked and peeled off and properties of the enamel wire are deteriorated when the enamel wire is bent.

In particular, a polyamideimide-based resin, widely used as the coating material of the enamel wire, has excellent physical properties, but it has a disadvantage of having poor adhesivity to a conductor, resulting in deterioration of flexibility and wear resistance of the enamel wire.

In order to solve the problems, various methods have been suggested to increase adhesivity of the polyamideimide-based resin to a conductor, for example by adding alkoxy-modified resin and benzotriazole to a polyamideimide resin solution (Japanese Laid-open Publication No. H3-37283); trialkylamine to a polyamideimide resin solution (Japanese Laid-open Publication No. H6-111632); or melamine resin to a polyamideimide resin solution (Japanese Laid-open Publication No. H10-334735).

However, these kinds of the compositions have problems that their solubility or compatibility is insufficient, or their storage stability is deteriorated since other additives reacts with unreacted terminal groups of the polyamideimide resin, etc.

DISCLOSURE OF INVENTION

Technical Problem

Accordingly, the present invention is designed to solve the problems of the prior art, and therefore it is an object of the present invention to provide polyamideimide-based enamel varnish composition for enamel wire capable of forming an insulated coating layer having an improved adhesivity to a conducting wire.

Also, it is another object of the present invention to provide an enamel wire having an improved adhesivity of an insulated coating layer to a conducting wire, as well as excellent properties such as wear resistance, flexibility, etc. using the aforementioned enamel varnish composition for enamel wire.

Technical Solution

In order to accomplish the above object, the present invention provides polyamideimide-based enamel varnish composition for enamel wire having polymeric resin components in organic solvent, wherein the polymeric resin component includes a first polyamideimide resin; and a second polyamideimide resin in which a triazine ring having an imidazole group in a side chain is introduced into a major chain.

Also, the present invention provides an enamel wire having a conducting wire; and a plurality of insulated coating layers formed in the outside of the conducting wire, wherein the enamel wire includes an insulated coating layer including, as the innermost insulated coating layer directly connected to an outer surface of the conducting wire, a first polyamideimide resin; and a second polyamideimide resin in which a triazine ring having an imidazole group in a side chain is introduced into a major chain.

Best Mode for Carrying Out the Invention

Hereinafter, the present invention will be described in detail.

The enamel varnish composition for enamel wire of the present invention includes, as a polymeric resin component, both of a conventional polyamideimide resin (Hereinafter, referred to as the first resin), and a polyamideimide resin (Hereinafter, referred to as the second resin) with an improved adhesivity.

In the present invention, the polyamideimide resin used as the first resin is not particularly limited if it may be used as coating materials of the enamel wire, but its number-average molecular weight preferably ranges from 10,000 to 70,000, considering the adhesivity to the conducting wire, the workability, etc. and it is also preferred to have an aromatic structure in a major chain. This first resin is, for example, presented in following Chemistry Figure 1:

Chemistry FIG. 1

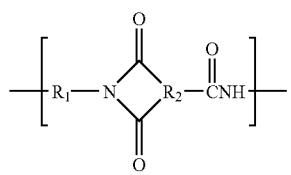

In the Chemistry Figure 1, $R_1$ is a residue derived from at least one aromatic diisocyanate selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate and p-xylenediisocyanate, $R_2$ is a residue derived from at least one acid compound selected from the group consisting of trimellitic acid, trimellitic dianhydride, trimellitic anhydride chloride or derivatives of the trimellitic acid.

Such a polyamideimide resin may be manufactured using the various methods widely known in the art, for example by polymerization reaction of the diisocyanate compound with various acid compounds under a suitable organic solvent. In the specification of the present invention, the term "acid compound" is referred to as a compound(s) including carboxyl group-including compounds and their various derivatives.

The preferred diisocyanate compounds includes diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate, p-xylenediisocyanate, etc., and they may be used as the aromatic compound alone or in mixtures thereof, but not limited thereto.

The preferred acid compound includes tribasic acid, tribasic anhydride, tribasic derivatives, etc., and they may be used as the aromatic compound. An example of the acid compound includes trimellitic acid, trimellitic dianhydride, trimellitic anhydride chloride or derivatives of the trimellitic acid, and they may be used alone or in mixtures thereof, but not limited thereto.

Also, tetracarboxylic acid, tetracarboxylic anhydride and its derivatives, dibasic acid, etc. may be additionally used as the acid compound, and they may improve physical properties of the polyamideimide resin by forming the more amide or imide bonds in their polymeric major chains. An example of the additional acid compound includes pyromellitic dianhydride, biphenyltetracarboxylic dianhydride, benzophenonetetracarboxylic dianhydride, diphenylsulfonetetracarboxylic dianhydride, terephthalic acid, isophthalic acid, sulfoterephthalic acid, dicitric acid, 2,5-thiophenecarboxylic acid, 4,5-phenanthrenecarboxylic acid, benzophenone-4,4'-dicarboxylic acid, phthaldiimidecarboxylic acid, biphenyldicarboxylic acid, 2,6-naphthalenedicarboxylic acid, diphenylsulfone-4,4'-dicarboxylic acid, adipic acid, etc. and they may be used alone or in mixtures thereof, but not limited thereto.

As a specific example, the reaction of tribasic anhydride with a diisocyanate compound, in which an amide bond and an imide bond are formed, may be presented in following Reaction Formula 1:

Reaction Formula 1

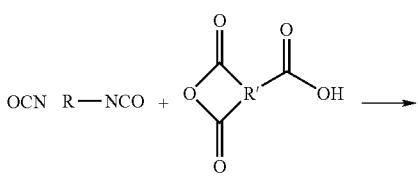

-continued

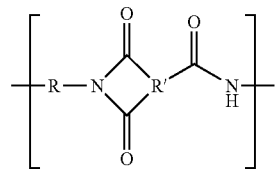

A number-average molecular weight of such a first resin preferably ranges from 10,000 to 70,000, considering compatibility with the second resin described later, wear resistance, workablility, etc.

Meanwhile, a triazine ring having an imidazole group in a side chain is introduced into a major chain in the second resin mixed with the first resin as described above in the present invention. Unlike the conventional polyamideimide resin, the polyamideimide resin of the present invention shows an improved adhesive force to the conducting wire since such a polar group is introduced into the second resin.

A preferred example of such a second resin is polyamideimide resin, presented in following Chemistry Figure 2.

fone-4,4'-diisocyanate, tolylene-2,4-diisocyanate, tolylene-2,6-diisocyanate, m-xylene diisocyanate and p-xylenediisocyanate, $R_4$ and $R_5$ each is independently a residue derived from at least one acid compound selected from the group consisting trimellitic acid, trimellitic dianhydride, trimellitic anhydride chloride or derivatives of the trimellitic acid, $R_6$ is selected from the group consisting of compounds presented in following Chemistry Figure 3;

Chemistry Figure 3

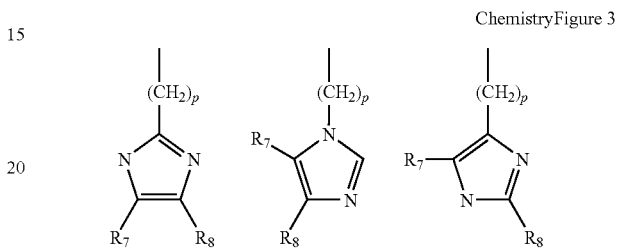

In the Chemistry Figure 3, p is an integer of 0 to 4, $R_7$ and $R_8$ each is independently hydrogen, methyl, ethyl group.

Such a second resin may be synthesized, for example using a following mechanism. First, a triazine compound, including two amine groups and imidazolyl groups in a side chain, reacts with a tribasic acid compound such as trimellitic dianhydride at a molar ratio of 1:2 to prepare an imidized dicarboxylic acid compound, which includes an imide group and carboxyl groups in both of its terminal ends. Then, a second polyamideimide resin, in which a triazine ring including an imidazolyl group as the side chain is introduced into a major chain, may be obtained by reacting a diisocyanate compound with the resultant imidized dicarboxyl compound. One example of such synthesis may be presented in following Reaction Formula 2.

Chemistry FIG. 2

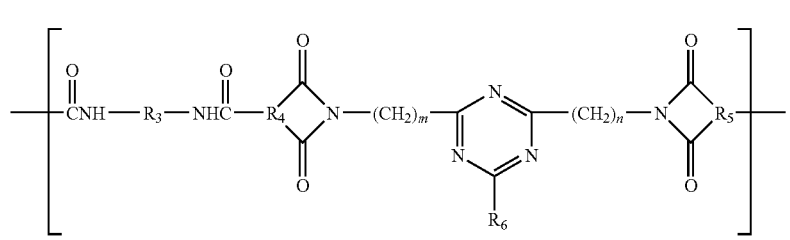

In the Chemistry Figure 2, m and n each is independently an integer of 0 to 2, $R_3$ is a residue derived from at least one aromatic diisocyanate selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsul- Reaction Formula 2

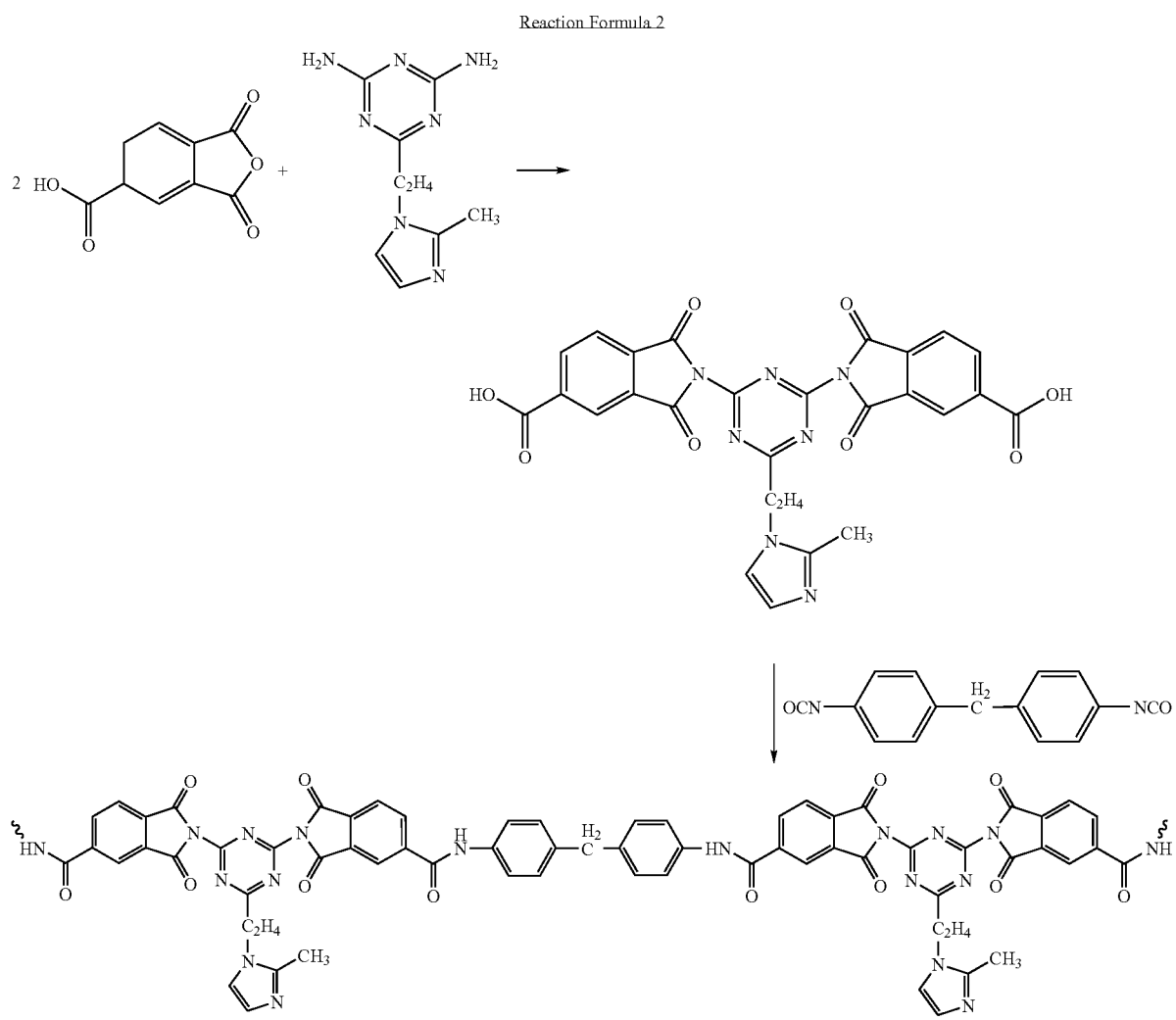

Referring to Reaction Formula 2, 1 mol of 2,4-diamino-6-[2'-methylimidazolyl-(1')]-ethyl-s-triazine may react with 2 mol of trimellitic dianhydride to synthesize imidized dicarboxylic acid, and then the desired second resin may be polymerized by adding diphenylmethane-4,4'-diisocyanate to the imidized dicarboxylic acid.

The diisocyanate compound and the acid compound, which may be used to synthesize such a second resin, are identical to the compound as described above in the first resin.

Also, the triazine compound having the two amine groups and imidazolyl groups in the side chain includes, for example 2,4-diamino-6-[2-(2-methyl-1-imidazolyl)ethyl]-s-triazine, 2,4-diamino-6-[2-(2-ethyl-1-imidazolyl)ethyl]-s-triazine, 2,4-diamino-6-[2-(2-imidazolyl)ethyl]-s-triazine, 2,4-diamino-6-[2-(1-imidazolyl)ethyl]-s-triazine, 2,4-diamino-6-(2-ethyl-4-imidazolyl)-s-triazine, 2,4-diamino-6-[2-(4-methyl-1-imidazolyl)ethyl]-s-triazine, 2,4-diamino-6-(2-ethyl-5-methyl-4-imidazolyl)-s-triazine, 2,4-diamino-6-(4-ethyl-2-methyl-1-imidazolyl)-s-triazine, 2,4-diamino-6-[3-(2-methyl-1-imidazolyl)propyl]-s-triazine, 2,4-diamino-6-[4-(2-imidazolyl)butyl]-s-triazine, 2,4-diamino-6-[2-(2-methyl-1-imidazolyl)propyl]-s-triazine, 2,4-diamino-6-[1-methyl-2-(2-methyl-1-imidazolyl)ethyl]-s-triazine, 2,4-diamino-6-[2-(2,5-dimethyl-1-imidazolyl)ethyl]-s-triazine, 2,4-diamino-6-[2-(2,4-dimethyl-1-imidazolyl)ethyl]-s-triazine, 2,4-diamino-6-[2-(2-ethyl-4-methyl-1-imidazolyl) ethyl]-s-triazine, etc. and they may be used alone or in mixtures thereof, but not limited thereto.

The enamel varnish composition for enamel wire according to the present invention includes both of the first resin and the second resin as described above. The polymeric resin component included in the composition according to the present invention may have an desired adhesive force to the conducting wire by adjusting a mixing ratio of the first resin and the second resin. At this point, the second resin preferably has a content of 1 to 20% by weight, based on the total weight of the resin included in the composition.

Such number-average molecular weight of the second polyamideimide resin preferably ranges from 10,000 to 70,000, considering the adhesivity to the conducting wire, the workablility, etc.

The organic solvent is not particularly limited as the polar solvent if it may be used in the enamel varnish composition for enamel wire according to the present invention. For example, NMP, DMF, DMAc, DMSO, etc. may be used alone or in mixtures thereof. And, it is preferred to use aromatic hydrocarbon as the diluent.

As described above, the enamel varnish composition for enamel wire according to the present invention includes the polyamideimide resin showing an excellent adhesive force to the conducting wire, and therefore, for the enamel wire having a conducting wire; and multi-layered insulated coating layers formed in the outside of the conducting wire, it may be useful to be used as the innermost insulated coating layer directly connected to the conducting wire.

As described above, the enamel wire having the composition according to the present invention as the innermost insulated coating layer may improve the adhesive force of the polyamideimide-based insulated coating layer to the conducting wire, compared to the conventional composition with the poor adhesive force, and therefore may further improve physical properties of the enamel wire such as wear resistance, flexibility, etc.

Preferably, the enamel wire according to the present invention further includes an insulated coating layer, which has the improved wear resistance, in the outside of the aforementioned innermost insulated coating layer.

This wear resistance insulated coating layer is preferably composed of polyamideimide resins, presented in following Chemistry Figure 4.

Chemistry FIG.4

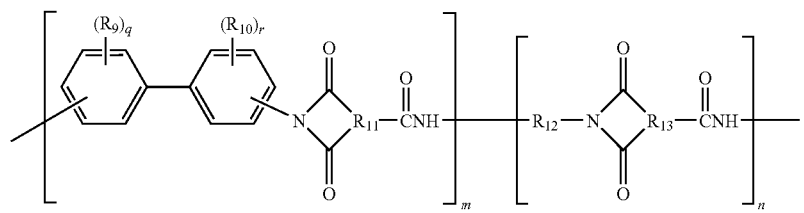

In the Chemistry Figure 4,
ratio of m:n ranges from 0.1:0.9 to 0.9:0.1,
$R_9$ and $R_{10}$ each is independently selected from the group consisting of alkyl group, alkoxy group and halogen, the alkyl group and the alkoxy group having 1 to 4 carbon atoms,
q and r each is an integer of 0 to 4,
$R_{11}$ and $R_{13}$ each is independently a residue derived from at least one acid compound selected from the group consisting of trimellitic acid, trimellitic dianhydride, trimellitic anhydride chloride or derivatives of the trimellitic acid, and
$R_{12}$ is a residue derived from at least one aromatic diisocyanate compound selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene tolylene-2,4-diisocyanate, tolylene-2,6-diisocyanate, m-xylene diisocyanate and p-xylenediisocyanate.

Such a polyamideimide resin, presented in the Chemistry Figure 4, may be synthesized using the methods known to those skilled in the art, for example by reacting the tribasic acid with diisocyanate, as described above in the Reaction Formula 1.

At this time, the diisocyanate having a biphenyl group and different kinds of aromatic diisocyanate compounds are mixed together and used as the diisocyanate. In this case, the diisocyanate compound having a biphenyl group preferably ranges from 10 to 90 mol %, more preferably from 30 to 70 mol %, most preferably from 40 to 60 mol %, based on the total mole of the used diisocyanate compound. If the diisocyanate compound having a biphenyl group has a content of less than 10 mol %, it has a slightly increased mechanical strength of the insulated coating, and if it exceeds a content of 90 mol %, the insulated coating tends to be easily brittle.

Here, a specific example of the diisocyanate compound having a biphenyl group includes biphenyl-4,4'-diisocyanate, biphenyl-3,3'-diisocyanate, biphenyl-3,4'-diisocyanate, 3,3'-chlorobiphenyl-4,4'-diisocyanate, 2,2'-chlorobiphenyl-4,4' diisocyanate, 3,3'-dibromobiphenyl-4,4'-diisocyanate, 2,2'-dibromobiphenyl-4,4'-diisocyanate, 3,3'-dimethylbiphenyl-4,4'-diisocyanate, 2,2'-dimethylbiphenyl-4,4'-diisocyanate, 2,3'-dimethylbiphenyl-4,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, 2,3'-dimethoxybiphenyl-4,4'-diisocyanate, 3,3'-diethoxybiphenyl-4,4'-diisocyanate, 2,2'-diethoxybiphenyl-4,4'-diisocyanate, 2,3'-diethoxybiphenyl-4,4'-diisocyanate, etc., and they may be used alone or in mixtures thereof, but not limited thereto.

Meanwhile, the biphenyl group-free aromatic diisocyanate compound includes, for example, diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate and p-xylenediisocyanate, etc., and they may be used alone or in mixtures thereof, but not limited thereto.

The preferred acid compound includes tribasic acid, tribasic anhydride, tribasic derivatives, etc., and they may be used as the aromatic compound. An example of the acid compound includes trimellitic acid, trimellitic dianhydride, trimellitic anhydride chloride or derivatives of the trimellitic acid, and they may be used alone or in mixtures thereof, but not limited thereto.

Also, tetracarboxylic acid, tetracarboxylic anhydride and its derivatives, dibasic acid, etc. may be additionally used as the acid compound, and they may improve physical properties of the polyamideimide resin by forming the more amide or imide bonds in their polymeric major chains. An example of the additional acid compound includes pyromellitic dianhydride, biphenyltetracarboxylic dianhydride, benzophenonetetracarboxylic dianhydride, diphenylsulfonetetracarboxylic dianhydride, terephthalic acid, isophthalic acid, sulfoterephthalic acid, dicitric acid, 2,5-thiophenecarboxylic acid, 4,5-phenanthrenecarboxylic acid, benzophenone-4,4'-dicarboxylic acid, phthaldiimidecarboxylic acid, biphenyldicarboxylic acid, 2,6-naphthalenedicarboxylic acid, diphenylsulfone-4,4'-dicarboxylic acid, adipic acid, etc., and they may be used alone or in mixtures thereof.

The polyamideimide resin having such a structure further improves physical properties such as wear resistance, workablility, etc. of the insulated coating layer for the enamel wire since it has a very excellent wear resistance. Also, its number-average molecular weight preferably ranges from 10,000 to 70,000, considering the wear resistance, the workablility, etc. of the enamel wire.

Preferably, the enamel wire according to the present invention further includes a lubricant insulated coating layer including polyamideimide resin in which a lubricant is present as the outermost layer of the insulated coating layer.

Such a lubricant insulated coating layer is an insulated coating layer in which lubricating materials such as low molecular weight polyethylene wax or polyester wax, etc. are included in the conventional polyamideimide resin, which is used for the insulated coating layer of the enamel wire. The lubricant insulated coating layer may improve a winding property of the enamel wire when the enamel wire is wound, and it may be also easily inserted into a narrow space, and therefore it may reduce damage of the insulated coating layer upon its use since it has a lubricating property in its surface.

The lubricant insulated coating layer used in the present invention may be synthesized using the methods known to those skilled in the art, and HI-406-SL (manufactured by the company Hitachi Chemical), etc. may be commercially available.

MODE FOR THE INVENTION

Hereinafter, preferred embodiments of the present invention will be described in detail referring to the accompanying drawings. Therefore, the description proposed herein is just a preferable example for the purpose of illustrations only, not intended to limit the scope of the invention, so it should be understood that other equivalents and modifications could be made thereto without departing from the spirit and scope of the invention. However, it should be understood that the preferred embodiments of the invention could be described more specifically to those skilled in the art from this detailed description.

Synthetic Example 1

Synthesis of the First Polyamideimide Resin 510 parts by weight of N-methyl pyrrolidone well dried at a room temperature was added to a 4-necked flask equipped with a stirrer and a condenser, and 201 parts by weight of trimellitic dianhydride was added and stirred. Then, 250 parts by weight of diphenylmethane-4,4'-diisocyanate (MDI) was added, warmed at 80° C. for 3 hours, followed by to 140° C. over 3 hours, and reacted at 140° C. for 2 hours to yield a polyamideimide resin solution. The solvents naphtha and xylene were added to the polyamideimide resin solution to yield a polyamideimide coating pigment having 27% by weight of a polymeric resin component.

Synthetic Example 2

Synthesis of the Second Polyamideimide Resin 675 parts by weight of N-methyl pyrrolidone well dried at a room temperature was added to a 4-necked flask equipped with a stirrer and a condenser, followed by 192.12 parts by weight of trimellitic dianhydride, and 109.65 parts by weight of 2,4-diamino-6-[2'-methylimidazolyl-(1')]-ethyl-s-triazine was added while stirring, warmed to 260° C. over 8 hours, and then 18 parts by weight of water was removed out as a by-product to yield an acid compound having an imide group. Then, the acid was cooled to a room temperature again, 112.5 parts by weight of diphenylmethane-4,4'-diisocyanate (MDI) was added thereto, warmed at 80° C. for 3 hours, followed by to 140° C. over 3 hours, and then heated at 140° C. for 3 hours to yield a polyamideimide resin solution. The solvents naphtha and xylene were added to the polyamideimide resin solution to yield a polyamideimide coating pigment having 20% by weight of a polymeric resin component.

Synthetic Example 3

686 parts by weight of N-methyl pyrrolidone well dried at a room temperature was added to a 4-necked flask equipped with a stirrer and a condenser, and 175.2 parts by weight of trimellitic dianhydride was added and stirred. Then, 100 parts by weight of diphenylmethane-4,4'-diisocyanate (MDI) and 158 parts by weight of 3,3'-dimethylbiphenyl-4,4'-diisocyanate (TODI) were added, warmed at 80° C. for 3 hours, followed by to 140° C. over 3 hours, and then reacted at 140° C. for 2 hours to yield a polyamideimide resin solution. The solvents naphtha and xylene were added to the polyamideimide resin solution to yield a wear-resistance polyamideimide coating pigment having 27% by weight of a polymeric resin component.

Examples 1 to 5

The various polyamideimide coating pigments obtained previously was used according to the content described in following Table 1 to manufacture an insulated wire composed of three kinds of insulated coating layers, wherein the mixed composition of polyamideimide pigments prepared in Synthetic examples 1 and 2 was used as the first layer (an inner layer) contacted with a copper wire (Unit: part by weight), the polyamideimide pigment composition prepared in Synthetic example 3 was used as the second layer (an intermediate layer), and HI-406-SL commercially available from the company Hitachi Chemical was used as the third layer (an outer layer). The used copper wire has a diameter of 1.495 mm, the insulated wire, in which an outer surface of the copper wire is coated using an enamel coater from the company SICME, has a diameter of 1.573 mm, and the insulated coating layer has a total thickness of 39 μm.

TABLE 1

| Coating Layer | Coating Pigment used | Example 1 | Example 2 | Example 3 | Example 4 | Example 5 |
|---|---|---|---|---|---|---|
| First Layer (Inner) | Synthetic example 1 | 100 | 100 | 100 | 100 | 100 |
|  | Synthetic example 2 | 5 | 10 | 15 | 20 | 30 |
| Second Layer(Intermediate) | Synthetic example 3 | Synthetic example 3 | Synthetic example 3 | Synthetic example 3 | Synthetic example 3 | Synthetic example 3 |
| Third Layer(Outer) | HI-406-SL | HI-406-SL | HI-406-SL | HI-406-SL | HI-406-SL | HI-406-SL |

Comparative Examples 1 to 4

According to the content listed in following Table 2, the insulated wire composed of three kinds of the insulated coating layers was manufactured in the Comparative examples 1 and 2, wherein the mixed composition of triethylamine and the polyamideimide pigment prepared in Synthetic example 1 was used as the inner layer contacted with a copper wire, the polyamideimide pigment composition prepared in Synthetic example 3 as used as the intermediate layer, and HI-406-SL commercially available from the company Hitachi Chemical was used as the outer layer. The used copper wire has a diameter of 1.495 mm, the insulated wire, in which an outer surface of the copper wire is coated using an enamel coater from the company SICME, has a diameter of 1.573 mm, and the insulated coating layer has a total thickness of 39 μm. Meanwhile, only the pigment composition prepared in Synthetic example 1 was used as the inner layer to form three kinds of the insulated coating layers in Comparative example 3, and the enamel wire composed of two kinds of the pigment compositions devoid of an adhesive coating layer was manufactured in Comparative example 4.

TABLE 2

| Coating Layer | Coating Pigment used | Comparative example 1 | 2 | 3 | 4 |
|---|---|---|---|---|---|
| First Layer (Inner) | Triethylamine | 1 | 2 | — | — |
|  | Synthetic example 1 | 100 | 100 | 100 | — |
| Second Layer (Intermediate) | Synthetic example 3 | Synthetic example 3 | Synthetic example 3 | Synthetic example 3 | Synthetic example 3 |
| Third Layer (Outer) | HI-406-SL | HI-406-SL | HI-406-SL | HI-406-SL | HI-406-SL |

The physical properties such as coating thickness, unidirectional wear resistance, adhesivity and flexibility were measured for the enamel wires prepared in the previous Examples and Comparative examples.

Adhesivity

Each insulated wire prepared in the previous Examples and Comparative examples was prepared at a length of 100 cm, and the resultant insulated wires were tensioned and broken at a speed of 20 cm/sec. Then, broken sections were observed, and then a floating distance (mm) between a conductor surface and a peeled insulated coating was measured. The result is listed in following Table 3.

Unidirectional Wear Resistance

Wear resistance was measured according to the method as described in KSC-3105. The result is listed in following Table 3.

Flexibility

A minimum diameter of the insulated wire which is not cracked and peeled off when the insulated wire made of each material was bent, is set to d (mm). The flexibility of each insulated wire was measured and described as the multiple of d (mm). The result is listed in following Table 3.

Referring to Table 3, it was revealed that the enamel wire manufactured in the Examples, which forms the inner insulated coating layer using the enamel varnish composition for enamel wire according to the present invention, shows an excellent adhesivity, and also an excellent properties such as the unidirectional wear resistance and the flexibility.

INDUSTRIAL APPLICABILITY

As described above, the enamel varnish composition for enamel wire according to the present invention shows an improved adhesivity since it includes a polyamideimide resin in which a triazine ring having an imidazolyl group as a side chain is introduced into a major chain. As a result, the enamel wire using the enamel varnish composition for enamel wire of the present invention has the excellent adhesivity of the insulated coating layer to the conducting wire, as well as the improved physical properties such as the wear resistance, the flexibility, etc.

The invention claimed is:

1. An enamel wire comprising:

a conducting wire; and a plurality of insulated coating layers formed outside of the conducting wire, the plurality of insulated coating layers comprising an adhesive coating layer in direct contact with an outer surface of the conducting wire, the adhesive coating layer formed of a mixed resin comprising:

(a) a first polyamideimide resin; and (b) a second polyamideimide resin that is a linear copolymer comprising a triazine ring as a repeating monomer in the major chain, the triazine ring having a functional group comprising an imidazole group.

2. The enamel wire according to claim 1, wherein the second polyamideimide resin is presented as Chemistry Figure 2:

TABLE 3

| Content | Example 1 | 2 | 3 | 4 | 5 | Comparative example 1 | 2 | 3 | 4 |
|---|---|---|---|---|---|---|---|---|---|
| Thickness of Coating Layer(Inner/Intermediate/Outer) (μm) | 9.75/ 26.0/ 3.25 | 9.75/ 26.0/ 3.25 | 9.75/ 26.0/ 3.25 | 9.75/ 26.0/ 3.25 | 9.75/ 26.0/ 3.25 | 9.75/ 26.0/ 3.25 | 9.75/ 26.0/ 3.25 | 9.75/ 26.0/ 3.25 | /  35.75/ 3.25 |
| Unidirectional Wear Resistance (kgf) | 2,600 | 2,630 | 2,300 | 2,200 | 1,900 | 1,900 | 2,100 | 2,200 | 2,300 |
| Adhesivity (mm) | 3 | 2 | 10 | 22 | 30 | 33 | 30 | 32 | 66 |
| Flexibility | 1d | 1d | 2d | 2d | 2d | 2d | 2d | 4d | 7d |

<Chemistry FIG. 2>

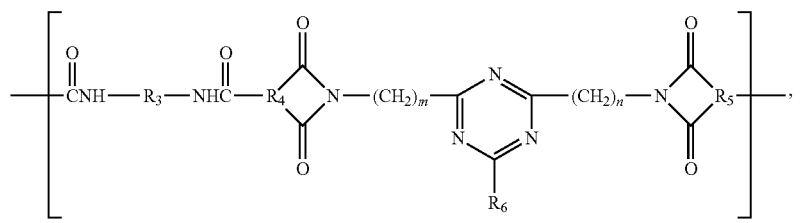

where m and n each is independently an integer of 0 to 2, $R_3$ is a residue derived from one or more aromatic diisocyanates selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate, and p-xylene diisocyanate, $R_4$ and $R_5$ each is independently a residue derived from one or more acid compounds selected from the group consisting of trimellitic acid, trimellitic dianhydride, trimellitic anhydride chloride, or derivatives of the trimellitic acid, and $R_6$ is selected from the group consisting of compounds presented as Chemistry Figure 3, <Chemistry FIG. 3>

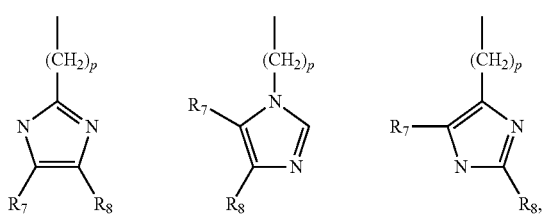

where p is an integer of 0 to 3, and $R_7$ and $R_8$ each is independently a hydrogen, a methyl, or an ethyl group.

3. The enamel wire according to claim 2, wherein the plurality of insulated coating layers comprise:
a wear-resistance coating layer in the outside of the adhesive coating layer, the wear-resistance coating layer comprising a polyamideimide resin being presented as Chemistry Figure 4:

<Chemistry FIG. 4>

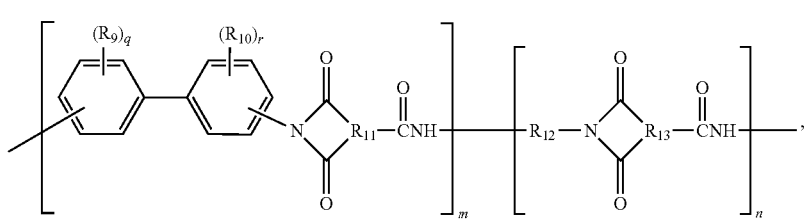

where a ratio of m:n ranges from 0.1:0.9 to 0.9:0.1, $R_9$ and $R_{10}$ each is independently selected from the group consisting of alkyl group, alkoxy group, and halogen, the alkyl group and the alkoxy group comprise 1 to 4 carbon atoms, q and r each is an integer of 0 to 4, $R_{11}$ and $R_{13}$ each is independently a residue derived from one or more acid compounds selected from the group consisting of trimellitic acid, trimellitic dianhydride, trimellitic anhydride chloride and trimellitic acid derivatives, $R_{12}$ is a residue derived from one or more aromatic diisocyanate compounds selected from the group consisting of diphenylmethane-4,4'diisocyanate, diphenylmethane-3,3'-diisocyanate, diphenylmethane-3,4'-diisocyanate, diphenylether-4,4'-diisocyanate, benzophenone-4,4'diisocyanage, diphenylsulfone-4,4'-diisocyanate, tolylene-2,4-diisocyanate, tolylene-2,6-diisocyanate, m-xylene diisocyanate, and p-xylenediisocyanate.

4. The enamel wire according to claim 3, wherein the plurality of the insulated coating layers comprise an outermost layer that comprises a lubricant-including polyamideimide resin.

5. The enamel wire according to claim 1, wherein the adhesive coating layer comprises 1 to 20% by weight of the second polyamideimide resin.

6. The enamel wire according to claim 1, wherein the number-average molecular weight of the first polyamideimide resin is in a range of from 10,000 to 70,000.

7. The enamel wire according to claim 1, wherein the number-average molecular weight of the second polyamideimide resin is in a range of from 10,000 to 70,000.

* * * * *